(No Model.)

P. H. & J. G. KNIPPER.
LUBRICATOR.

No. 524,112. Patented Aug. 7, 1894.

Witnesses
Jos. N. Bates
Thomas Durant

Inventors
Peter H. Knipper
Joseph G. Knipper
by Church & Church
Their Attorneys

UNITED STATES PATENT OFFICE.

PETER H. KNIPPER AND JOSEPH G. KNIPPER, OF ROCHESTER, NEW YORK, ASSIGNORS OF ONE-HALF TO SAMUEL JENKINSON AND MAGULER BUTLER, OF SAME PLACE.

LUBRICATOR.

SPECIFICATION forming part of Letters Patent No. 524,112, dated August 7, 1894.

Application filed July 6, 1893. Serial No. 479,712. (No model.)

*To all whom it may concern:*

Be it known that we, PETER H. KNIPPER and JOSEPH G. KNIPPER, of Rochester, in the county of Monroe and State of New York, have invented certain new and useful Improvements in Lubricators; and we do hereby declare the following to be a full, clear, and exact description of the same, reference being had to the accompanying drawings, forming a part of this specification, and to the reference-numerals marked thereon.

Our present invention has for its object to provide a lubricator adapted to feed heavy oils and particularly those containing plumbago or similar materials to the cylinder or pipes of steam engines, and it consists in certain improvements in construction and combinations of parts all as will be hereinafter fully described and the novel features pointed out in the claims at the end of this specification.

Figure 1:
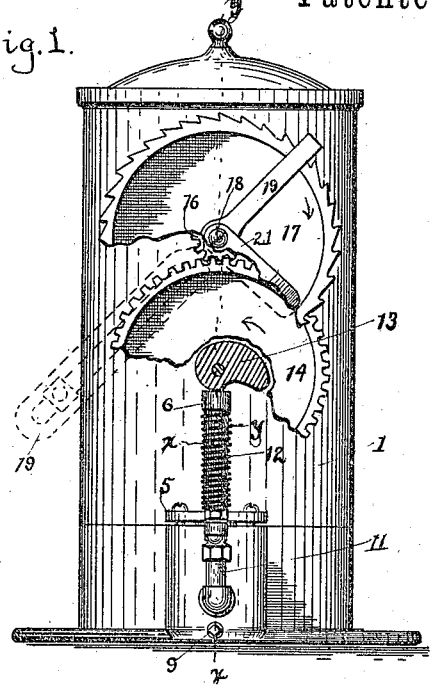
Figure 2:
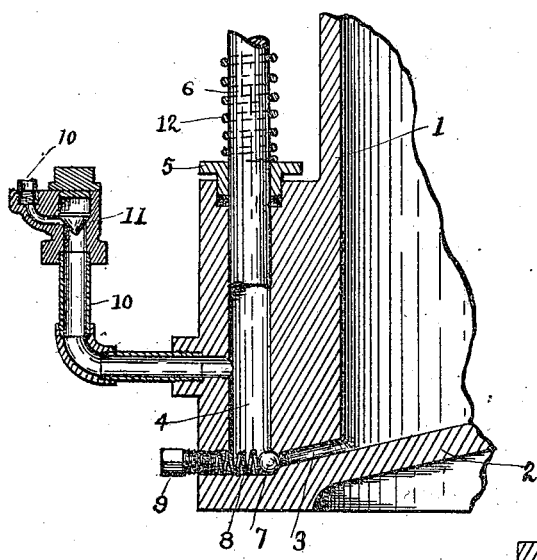
Figure 3:
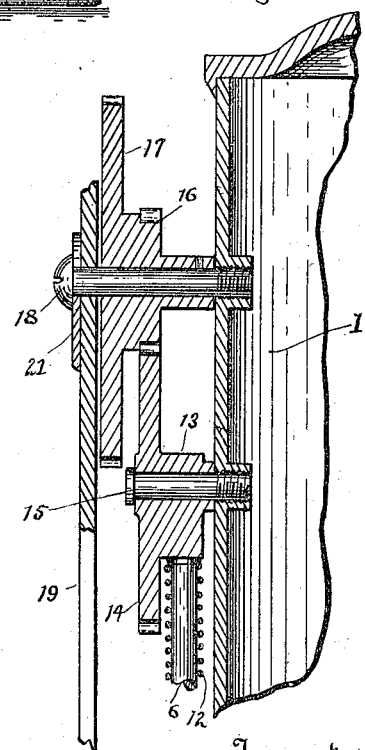
Figure 4:
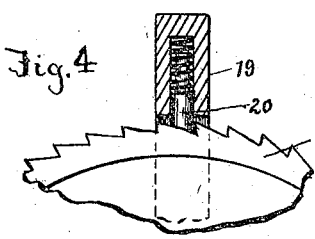

In the drawings Figure 1 is a side elevation of the lubricator constructed in accordance with our invention; Fig. 2, a sectional view on the line X—X of Fig. 1; Fig. 3, a sectional view on the line y—y of Fig. 1, and Fig. 4 a view of a detail.

Similar reference numerals indicate similar parts in the several figures.

In carrying out our invention we provide a chamber or reservoir, 1, preferably of metal, having an inclined bottom, 2, as in Fig. 2, with the lower portion of which connects a passage or channel 3, leading to a cylinder, 4, formed in an offset integral with the cylinder, said cylinder having at the upper portion a packing gland 5, through which passes a plunger or piston, 6, approximately fitting the cylinder and adapted to be reciprocated therein. A ball check-valve 7 is arranged in the cylinder at the entrance of the passage 3, held normally closed by a spring, 8, the tension of which may be adjusted by a screw, 9. Leading from the cylinder 4 is a pipe 10 passing to the steam pipe of the engine or other place desired, in which is interposed a check-valve, 11 for preventing the backward movement of the oil when the piston is moved upward.

The piston 6 is provided with a head at its upper end between which and the top of the cylinder is arranged a spring 12 for the purpose of moving said piston upward rapidly, to draw oil from the reservoir into the cylinder 4, and above said piston is a cam 13 secured to or formed integral with a gear 14, mounted upon a stud 15 preferably screwed into the side of the reservoir. Meshing with the gear 14 is a pinion 16 formed integral with or secured to a ratchet wheel 17 mounted upon a stud 18 also screwing into the side of the reservoir and upon the outer end of said stud is hung a slotted arm or lever 19 adapted to be vibrated by any suitable reciprocating part of the engine, said arm having the recessed portion projecting over the edge of the wheel, in which is arranged a spring pawl 20 co-operating with the ratchet wheel 17 and adapted to turn the latter when the arm is vibrated in one direction. A friction spring 21 is also arranged on the stud 18 pressing on the face of the wheel 17 and preventing backward rotation of the latter when the end of the arm carrying the pawl is moved back.

The operation of the parts will now be apparent, the vibration of the arm 19 serving to rotate the cam 13 through the gearing causing the gradual depression of the plunger forcing the oil in the cylinder through the pipe 10 to the steam pipe or other place desired and when the highest portion of the cam passes off the end of the plunger, the spring will raise the latter suddenly, drawing oil from the reservoir into the cylinder through the passage 3.

By employing a cam and spring operated plunger, not only do we have a practically continuous feed of oil, but the quick movement of the plunger when drawing oil from the reservoir, we find, operates very much better when heavy oil containing plumbago is being fed, than a piston moving slowly in both directions, and also the deposit and retention of the plumbago in the bottom of the cylinder is prevented, as it will be drawn into the cylinder by a quick stroke, while a slow one would permit the oil to pass slowly through the plumbago, if the channel were slightly clogged.

Our device is very simple and cheap in construction and we find in practice is admirably adapted for the purpose.

It will be understood that while we prefer the ratchet wheel shown herein, other forms of operating mechanism could be employed for rotating the cam.

We claim as our invention—

1. In a lubricator, the combination with the reservoir having the cylinder formed in the side thereof, the passage leading from the reservoir to the cylinder, the valve therein and the spring and adjusting plug 9, of the piston operating in the cylinder, and means for operating it, substantially as described.

2. In a lubricator, the combination with the reservoir having the small cylinder at the side formed integral therewith provided with the ports and valves as shown, and the piston operating in the cylinder, of the stud secured to the side of the reservoir above the cylinder, the gear-wheel mounted thereon having the cam for actuating the piston, the second stud secured to the side of the reservoir, the connected gear and ratchet-wheel, and the vibratory lever mounted on said stud, the whole arranged and operating substantially as described.

PETER H. KNIPPER.
JOSEPH G. KNIPPER.

Witnesses:
FRED F. CHURCH,
NETTIE E. WILSON.